US010623197B2

(12) United States Patent
Maeng et al.

(10) Patent No.: US 10,623,197 B2
(45) Date of Patent: Apr. 14, 2020

(54) METHOD AND APPARATUS FOR GIVING MONOPOLY OF CALL IN CALL TRANSMISSION/RECEPTION SYSTEM USING UPNP

(75) Inventors: Je-Young Maeng, Gyeonggi-do (KR); Se-Hee Han, Seoul (KR); Joo-Yeol Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1088 days.

(21) Appl. No.: 12/942,353

(22) Filed: Nov. 9, 2010

(65) Prior Publication Data
US 2011/0116496 A1    May 19, 2011

(30) Foreign Application Priority Data

| Nov. 9, 2009 | (KR) | 10-2009-0107575 |
| Jan. 20, 2010 | (KR) | 10-2010-0005364 |
| Feb. 12, 2010 | (KR) | 10-2010-0013502 |
| Mar. 15, 2010 | (KR) | 10-2010-0022708 |

(51) Int. Cl.
H04L 12/28       (2006.01)
H04L 29/06       (2006.01)

(52) U.S. Cl.
CPC ...... *H04L 12/2809* (2013.01); *H04L 65/1046* (2013.01); *H04L 65/1069* (2013.01); *H04L 65/1096* (2013.01)

(58) Field of Classification Search
CPC ............. H04L 65/1046; H04L 65/1096; H04L 65/1069; H04L 12/2809; H04L 65/1066; H04L 63/08; H04L 63/0853; H04L 63/12; H04L 63/20; H04W 12/06; H04W 76/02; H04W 12/00; H04W 12/08

USPC .................................. 370/352; 713/150, 155
See application file for complete search history.

(56) References Cited

U.S. PATENT DOCUMENTS

| 7,761,108 | B2 | 7/2010 | Lim | |
| 8,307,093 | B2* | 11/2012 | Klemets et al. | 709/227 |
| 8,335,818 | B2 | 12/2012 | Huetter et al. | |
| 8,549,155 | B2 | 10/2013 | Skog et al. | |
| 2003/0126239 | A1* | 7/2003 | Hwang | 709/220 |
| 2004/0125814 | A1* | 7/2004 | Christie et al. | 370/410 |
| 2005/0141566 | A1 | 6/2005 | Krzyzanowski | |
| 2006/0156388 | A1* | 7/2006 | Stirbu et al. | 726/4 |
| 2006/0184851 | A1 | 8/2006 | Froidcoeur et al. | |
| 2006/0248332 | A1* | 11/2006 | Kim et al. | 713/155 |

(Continued)

FOREIGN PATENT DOCUMENTS

| CN | 101404603 | 4/2009 |
| JP | 2004-187149 | 7/2004 |

(Continued)

*Primary Examiner* — Asad M Nawaz
*Assistant Examiner* — Najeeb Ansari
(74) *Attorney, Agent, or Firm* — The Farrell Law Firm, P.C.

(57) ABSTRACT

A method of giving a monopoly of a call in a call transmission/reception system using UPnP (Universal Plug and Play) includes a telephony server setting a user's authority to manage a session when the telephony server generates the session; the telephony server performing a user authentication when the telephony server receives a call for an action for managing the session from a control point; and the control point performing the action for managing the session if a user of the control point has an authority to manage the session as the result of authentication.

14 Claims, 10 Drawing Sheets

(56) References Cited

U.S. PATENT DOCUMENTS

| | | | |
|---|---|---|---|
| 2006/0259631 A1* | 11/2006 | Gargi | H04L 67/125 709/229 |
| 2007/0043941 A1* | 2/2007 | Kunito et al. | 713/150 |
| 2007/0143488 A1* | 6/2007 | Pantalone | 709/230 |
| 2009/0240803 A1 | 9/2009 | Iwakawa | |
| 2009/0265551 A1* | 10/2009 | Tripunitara | H04L 63/101 713/168 |
| 2009/0265765 A1* | 10/2009 | Vogler et al. | 726/4 |
| 2009/0287828 A1* | 11/2009 | Wei | H04L 65/1083 709/227 |
| 2010/0023613 A1* | 1/2010 | Gao | G06F 13/385 709/224 |
| 2010/0251348 A1* | 9/2010 | Verma | 726/7 |
| 2010/0257461 A1* | 10/2010 | Brewer | H04L 12/1822 715/755 |

FOREIGN PATENT DOCUMENTS

| | | |
|---|---|---|
| JP | 2005-244275 | 9/2005 |
| JP | 2006-042357 | 2/2006 |
| JP | 2009-501371 | 1/2009 |
| JP | 2009-230540 | 10/2009 |
| KR | 1020060086268 | 7/2006 |
| KR | 1020060130635 | 12/2006 |

\* cited by examiner

```xml
<?xml version="1.0" encoding="UTF-8"?>
<callinfolist
        xmlns="urn:schemas-upnp-org:telephony:cams:cil"
        xmlns:xsi="http://www.w3.org/2001/XMLSchema-instance"
        xsi:schemaLocation="urn:schemas-upnp-org:telephony:cams:cil
        <http://www.upnp.org/schemas/telephony/cams-v1-cil.xsd>telephony
    < callinfo>
        <callid>unique call ID </callid>
        <callsessioninfo>
            <callsessionid>1</callsessionid>
            <sessionOwner type="User_and_Role">Jeyoung_and_Admin</sessionOwner>
        <callsessioninfo>
        <priority> priority of call </priority>
        <otherpartyid> other party's ID </otherpartyid>
        <callstatus> status of call </callstatus>
        <TC>
            <UDN>uuid:UUID </UDN>
            <mediasessionid>Unique media session ID</mediasessionid>
            < mediasessioninfo>
                < mediasessionid>2</mediasessionid>
                <sessionOwner type="User">Jeyoung</sessionOwner>
            <mediasessioninfo>
            <mediasessioninfo>
                < mediasessionid>3</mediasessionid>
                <sessionOwner type="User">Jeyoung</sessionOwner>
                <sessionOwner type="Role">Admin</sessionOwner>
            <mediasessioninfo>
        </TC>
        <mediacapability format=format of media capability >
            Media capability
        </mediacapability>
    </ callinfo>
    < callinfo>
        <callid> unique call ID </callid>
        <priority> priority of call </priority>
        <otherpartyid> other party's ID </otherpartyid>
        <callstatus> status of call </callstatus>
        <TC>
            <UDN>uuid:UUID </UDN>
            <mediasessionid>Unique media session ID</mediasessionid>
        </TC>
        <mediacapability format=format of media capability >
            Media capability
        </mediacapability>
    </ callinfo>
</callinfolist>
```

FIG.3

```xml
<?xml version="1.0" encoding="UTF-8"?>
<sessionACL
    xmlns="urn:schemas-upnp-org:telephony:cams:cil"
    xmlns:xsi="http://www.w3.org/2001/XMLSchema-instance"
    xsi:schemaLocation="urn:schemas-upnp-org:telephony:cams:sacl
    http://www.upnp.org/schemas/telephony/cams-v1-sacl.xsd">
        <callsessioninfo id="1" >
            <sessionOwner type="User_and_Role">Jeyoung_and_Admin</sessionOwner>
        <callsessioninfo>
        < mediasessioninfo id="2" >
            <sessionOwner type="User" >Jeyoung</sessionOwner>
        <mediasessioninfo>
        <mediasessioninfo id="3">
            <sessionOwner type="User" >Jeyoung</sessionOwner>
            <sessionOwner type="Role" >Admin</sessionOwner>
        <mediasessioninfo>
<
</sessionACL>
```

FIG.4

```xml
<?xml version="1.0" encoding="UTF-8"?>
<CallInfo
xmlns="urn:schemas-upnp-org:phone:cams"
xmlns:xsi="http://www.w3.org/2001/XMLSchema-instance"
xsi:schemaLocation="urn:schemas-upnp-org:phone:cams
<http://www.upnp.org/schemas/phone/cams.xsd>">
  <callID> unique call ID</callID>
  <SessionOwner> User name who monopolize this callsession</SessionOwner>
  <TCPNames> unique name for TCP </TCPNames>
      <callStatus reason="reason why status is changed"> status of call</callStatus>
      <priority> priority of call </priority>
      <otherPartyID> other party's ID</otherPartyID>
      <TCList>
          <TC>
            <UDN>uuid:UUID</UDN>
            <mediaSessionID>Unique media session ID</mediaSessionID>
            <SessionOwner> User name who monopolize this Mediasession</SessionOwner>
          </TC>
          <TC>
            <UDN>uuid:UUID</UDN>
            <mediaSessionID>Unique media session ID</mediaSessionID>
            <SessionOwner> User name who monopolize this Mediasession</SessionOwner>
          </TC>
      </TCList>
      <mediaCapability format="format of media capability">
      Media capability
      </mediaCapability>
</CallInfo>
```

FIG.8

METHOD AND APPARATUS FOR GIVING MONOPOLY OF CALL IN CALL TRANSMISSION/RECEPTION SYSTEM USING UPNP

PRIORITY

This application claims priority under 35 U.S.C. § 119(a) to applications filed in the Korean Industrial Property Office on Nov. 9, 2009, Jan. 20, 2010, Feb. 12, 2010, and Mar. 15, 2010, and assigned Serial Nos. 10-2009-0107575, 10-2010-0005364, 10-2010-0013502, and 10-2010-0022708, respectively, the contents of which are incorporated herein by reference.

BACKGROUND OF THE INVENTION

1. Field of the Invention

The present invention relates generally to a UPnP (Universal Plug and Play) protocol, and more particularly to a method and an apparatus for giving a monopoly of a call in a UPnP telephony service for a call transmission/reception using the UPnP.

2. Description of the Related Art

In general, a home network is composed of an IP (Internet Protocol)-based private network. Such a home network connects and controls diverse devices, such as personal computers (PC), intelligent products, wireless devices, and the like, in a network through middleware to form a common virtual computing environment. Here, the middleware is configured to connect diverse devices in a peer-to-peer relationship to make the devices communicable with one another. Up to now, as the middleware, HAVI (Home AV Interoperability), UPnP (Universal Plug and Play), Jini (Java Intelligent Network Infrastructure), HWW (Home Wide Web), and the like, have been utilized.

In the computing environment constructed using the UPnP middleware, the respective devices are allocated with addresses from a server according to a DHCP (Dynamic Host Configuration Protocol) or addresses selected by auto IP (Internet Protocol) designation function (auto IP), and perform communication with one another and a search/inquiry on a network through the allocated addresses.

The UPnP network is a home network technology that is most commonly used at present, and defines a UPnP device, a UPnP service, and a protocol between them. The UPnP network is composed of controlled devices (CD) that are home network devices connected to and controlled by an IP-based home network, and control points (CP) that are devices controlling the controlled devices. The control point, which is a device that performs the control of the controlled devices, requests an event from a controlled device, and receives the event from the controlled device. The controlled device is a device that performs a determined function according to the request of the control point. If a state is changed, the controlled device transmits the requested event to the control point that has requested the event.

The UPnP network devices as configured above perform processes such as advertisement, discovery, description, control and eventing.

The advertisement process is a process in which a new controlled device is connected to the home network and informs other devices on the home network of itself.

The discovery process is a process in which a new control point is connected to the home network and searches for the controlled devices that operate on the home network.

The description process is a process in which the control point grasps the function of a newly added device by parsing a service description XML (Extensible Markup Language) file or a device description XML file through an IP address of the searched controlled device in order to control the controlled device.

The control process is a process in which the control point, when intending to provide a specified service through the controlled device, transmits a control message (action request) for requesting a predetermined service to the corresponding controlled device using a SOAP (Simple Object Access Protocol) according to a UPnP device architecture, and receives a response message (result, variable value) to the control message.

The eventing process is a process in which the information change state of the controlled device that has provided the predetermined service is confirmed according to a control command transmitted from the control point.

At present, in a UPnP telephony WC (Working Committees), the standard for controlling equipment having a telephony function by using equipment that does not have the telephony function in a home network based on the UPnP technology and making it possible to make a call using the equipment has been established. At present, UPnP does not provide appropriate security with respect to a call, and thus even if a specified user makes a phone call, a certain user can disconnect the call or tap a telephone wire.

In order to solve this problem, the UPnP telephony intends to adopt a Device Protection (DP) standard of which the standardization has now been performed in 1 security TF (Task Force) of the UPnP IGD (Internet Gateway Device) WC. However, since the device production is basically prepared on the basis of the IGD, it is difficult to solve the problems handled in the telephony service.

The UPnP device protection provides the security for the device through the following processes. First, a role that can call an action for each action is defined for each DCP (Device Control Protocol), and the UPnP equipment that implements the device protection service can determine whether to perform an action with reference to a mapping table when a request for executing the action is input from the CP.

Then, all the CPs that have not been authenticated have public authority. If the CP finds the DP service, it performs an introduction process, and the device authenticates the DP.

Then, the device can give a role to each CP, and if necessary, can additionally perform a user authentication, and a user can also receive the role.

Using the table, the CP can call the action having the use authority, and the service confirms the call authority and performs the action.

However, this technique has the following problems. First, the telephony service does not appropriately give the role to the respective devices. If the device has the role, another user may unintentionally end a call or shift a call session using a device having a manager role while a user makes the call. In general, the call belongs to the user who has initially set the call, and it is the user's own authority, which started the call, to end the call or to shift a session. Accordingly, the authority of the call user may be infringed due to the giving of the role to the device.

Second, the DP is basically prepared on the basis of the IGD, and executable actions and non-executable actions are clearly discriminated. In the case of a gateway, an action that can affect the system exists, and it is necessary that only a manager can call the action. However, the telephony does not have such clear discrimination. This is because, even if the authority of a specified user is weak, it is impossible to make the specified user not shift the call session or not ring off the call. Accordingly, the user can perform all the actions, and it is not appropriate for the telephony to determine the authority by actions.

Accordingly, there is a need for a scheme capable of protecting the call user's authority that is appropriate to the telephony service using UPnP.

SUMMARY OF THE INVENTION

Accordingly, the present invention has been made to solve the above-mentioned problems occurring in the prior art, and the present invention provides a method and an apparatus capable of managing a phone call by giving a monopoly of the call to protect an authority of a call user in a telephony service using UPnP (Universal Plug and Play).

In accordance with an aspect of the present invention, there is provided a method of giving a monopoly of a call in a call transmission/reception system using UPnP (Universal Plug and Play), which includes a telephony server setting a user's authority to manage a session when the telephony server generates the session; the telephony server performing a user authentication when the telephony server receives a call for an action for managing the session from a control point; and the control point performing the action for managing the session if a user of the control point has an authority to manage the session as the result of authentication.

In the method according to an embodiment of the present invention, the telephony server setting the user's authority to manage the session includes setting a role that can manage the session and a user identity (ID); and setting at least one of the set role and user ID as a judgment reference for managing the session.

In the method according to an embodiment of the present invention, the telephony server setting the user's authority to manage the session includes the telephony server transferring information on the role that can manage the session and the user ID and the judgment reference for managing the session to the control point through a UPnP action.

In the method according to an embodiment of the present invention, the telephony server setting the user's authority to manage the session includes setting a user ID that can manage the session by a user's input when the telephony server generates the session.

In the method according to an embodiment of the present invention, the telephony server performing the user authentication includes receiving the call for the action for managing the session including the user ID from the control point; and the telephony server determining whether to execute the action by comparing the user ID included in the action with the user ID set so as to manage the session.

In the method according to an embodiment of the present invention, the telephony server setting the user's authority to manage the session includes setting a user ID that can manage the session when the telephony server generates the session; and transferring information on the user ID that can manage the session to the control point.

In the method according to an embodiment of the present invention, performing the user authentication includes the server receiving the call for the action for managing the session including the user ID from the control point; and the telephony server determining whether to execute the action by comparing the user ID included in the action with the user ID set so as to manage the session.

In accordance with another aspect of the present invention, there is provided a telephony server for giving a monopoly of a call in a call transmission/reception system using a UPnP (Universal Plug and Play), which includes a call control service that performs a control for performing a call transmission request, a response to a call reception request, and a call data transmission; a telephony data transmission service for controlling a call data transmission/reception between a telephony terminal and an electronic device; and a telephony profile management service for receiving and storing a profile recorded with capability information to be actually used from a telephony control point; wherein the telephony profile management service sets a user authority that can manage a session when the session is generated, performs a user authentication when a call for an action for managing the session is received from the telephony control point; and performs the action for managing the session if a user of the control point has an authority to manage the session as the result of authentication.

BRIEF DESCRIPTION OF THE DRAWINGS

The above and other aspects, features and advantages of the present invention will be more apparent from the following detailed description taken in conjunction with the accompanying drawings, in which:

FIG. 3 illustrates an example of call information including a list that indicates a session correction authority according to an embodiment of the present invention;

FIG. 4 illustrates an example of transferring a list that indicates a session correction authority using an independent state variable according to an embodiment of the present invention;

FIG. 8 illustrates an example of call information including a list that indicates a session correction authority according to another embodiment of the present invention;

DETAILED DESCRIPTION OF EMBODIMENTS OF THE PRESENT INVENTION

Figure 1:
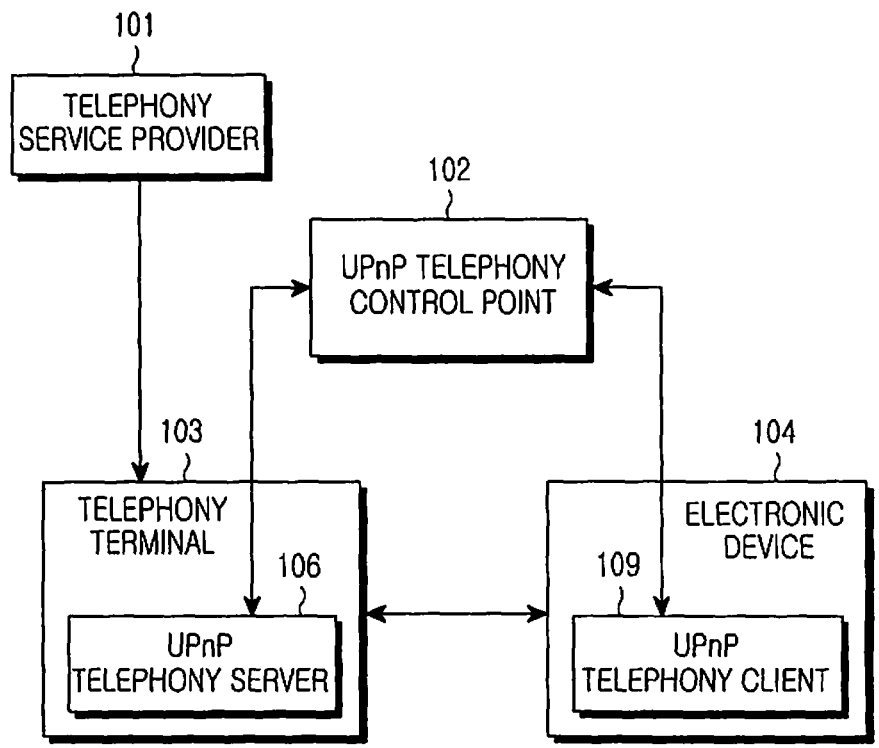
FIG. 1 is a block diagram illustrating the configuration of a UPnP telephony system according to an embodiment of the present invention.

Hereinafter, embodiments of the present invention will be described with reference to the accompanying drawings. In the following description, the same elements will be designated by the same reference numerals although they are shown in different drawings. Further, various specific definitions found in the following description are provided only to help the general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

FIG. 1 is a block diagram illustrating the configuration of a UPnP telephony system according to an embodiment of the present invention.

The UPnP (Universal Plug and Play) telephony system according to an embodiment of the present invention includes a telephony service provider 101, a UPnP telephony control point (hereinafter referred to as a "control point") 102, a telephony terminal 103, and an electronic device 104. Here, the telephony terminal 103 and the electronic device 104 are communicably connected using the control point 102 and UPnP protocol.

The telephony service provider 101 provides a telephony service, and provides an interface for transmitting/receiving a call to the telephony terminal 103.

The UPnP telephony control point 102 is a logical software module that controls the UPnP telephony server 106 and the UPnP telephony client 109 using a UPnP action. The UPnP telephony control point 102 may be configured in a device, such as a PC (Personal Computer), a PDA (Personal Digital Assistant), or the like, separately from the telephony terminal 103 and the electronic device 104, or in a physical device such as the telephony terminal 103 or the electronic device 104. If the control point 102 is included in the physical device such as the telephony terminal 103 or the electronic device 104, the control point 102 can directly control the UPnP telephony server 106 or the UPnP telephony client 109 without using the UPnP action.

The control point 102 determines media, a protocol, and a transmission format to be used for the call transmission/reception using capability information of a call data transmission agent which is transmitted from the UPnP telephony server 106 and included in the UPnP telephony server 106 or the UPnP telephony client 109. Also, the control point 102 sets an environment of a call data transmission agent included in the telephony terminal 103 or the electronic device 104 by generating a profile in which the determined media, protocol, and transmission format are defined and transmitting the profile to the UPnP telephony server 106 or the UPnP telephony client 109.

The telephony terminal 103 is a physical device such as a CE (Computer Engineering) device including a telephone set, a PC including a VoIP (Voice over IP) configured by software, or a mobile communication terminal interlocking with a communication network, and includes the UPnP telephony server 106 configured by software. Also, the telephony terminal 103 controls the call transmission/reception using the telephony service provider 101 that provides the telephony service and an interface provided by the corresponding telephony service provider 101.

The electronic device 104 is a physical device such as a mobile communication terminal, a CE device which can input/output a user's voice or video such as a video phone, a PC, or a TV, and includes the UPnP telephony client 109 configured by software. As described above, according to the present invention, a user can conveniently transmit/receive a call inside the house using the home network system.

Figure 2:
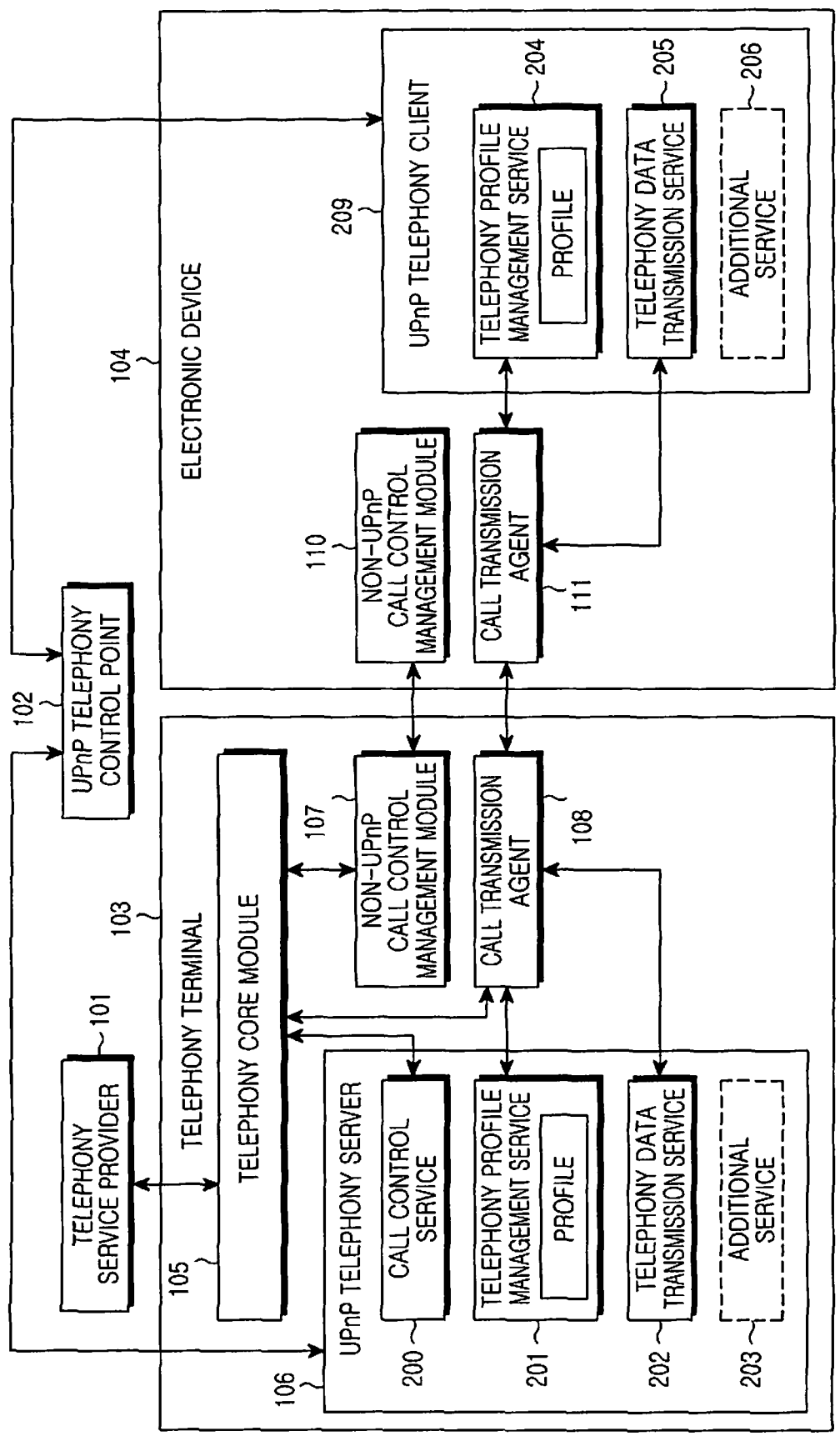
FIG. 2 is a block diagram illustrating the detailed configuration of a UPnP telephony system according to an embodiment of the present invention.

The UPnP telephony system as described above will be described in more detail with reference to FIG. 2, which is a block diagram illustrating the detailed configuration of a UPnP telephony system according to an embodiment of the present invention.

First, a telephony terminal 103 includes a telephony core module 105, a UPnP telephony server 106, a non-UPnP call control management module 107, and a call transmission agent 108.

The telephony core module 105 is a module that includes constituent elements of a general terminal that constitutes the telephony terminal 103. The telephony core module 105 not only performs a call transmission request, a response to a call reception request, and a call data transmission by connecting to a cellular network but also performs diverse services provided by a telephony service provider 101. In an embodiment of the present invention, the telephony core module 105 can be replaced by any module such as a VoIP module that is connected to the telephony service provider 101 to provide a telephony service.

The UPnP telephony server 106 includes a call control service 200, a telephony profile management service 201, a telephony data transmission service 202, and an additional service 203. The respective constituent elements will be described in detail as follows. In this case, the call control service 200, the telephony profile management service 201, and the telephony data transmission service 202 may be configured as one call management service module.

The call control service 200 controls the telephony core module 105 to perform a call transmission request, a response to a call reception request, and a call data transmission, and through this, transmits information related to a call to the telephony service provider 101. The call control service 200 performs an internal control, and the UPnP telephony control point 102 transmits a call control signal using a UPnP action to control the call control service 200. At this time, the call control signal includes a preparation step for providing an audible indication, such as ringing a bell, for notifying a user of the call reception and transmitting audio data between the telephony terminal 103 and the electronic device. The call control signal also includes ReceiveCall( ) for notifying the telephony core module 105 of the call reception, SendCall( ) for notifying a user of the call transmission and transmitting the call together with a phone number of an opposite party's terminal to which the call is to be transmitted, TerminateCall( ) for notifying a user of the termination of the call data transmission/reception, RequestSendSMS( ) for notifying a user of the transmission of an SMS message, and Sendkeyvalue( ) for transferring a key value generated to use diverse ARS (Automatic Response Service).

As described above, the UPnP telephony control point 102 controls the call control service 200, and the call control service 200 internally controls the telephony core module 105.

The telephony profile management service 201 provides the capability of the call transmission agent 108 owned by the telephony terminal 103 or the electronic device 104 to the UPnP telephony control point 102 in order to synchronize the data standards transmitted between the telephony terminal 103 and the electronic device 104. Also, the telephony profile management service 201 receives and stores a profile recorded with capability information to be actually used from the UPnP telephony control point 102. Such a profile includes a unique identifier of the telephony terminal 103 or the electronic device 104, an audio/video data codec, a data type, a communication protocol, parameters related to other video/audio transmission/reception, and information for the channel transmission. Accordingly, using the included identifier during the call transmission/reception, the telephony terminal 103 and the electronic device 104 can be discriminated.

On the other hand, the telephony profile management service 201 according to the present invention sets a user's authority that can manage a communication session when the session is generated, and performs an action only with respect to a user who has the authority for the session in order to give a call monopoly. The user's authority that can manage the session can determine and set a role that can manage each session and a user identity (ID). Also, the user's authority can set at least one of the role set so as to manage the session and the user ID as a judgment standard for the session management, and perform the action that manages the session only in the case where the roles and/or the user IDs coincide with each other.

Also, in order to set the user's authority that can manage the session, the user ID that can use the corresponding session can be set according to a session ID. In this case, when the session is generated, the user ID that can manage the session is set by a user's input through the UPnP telephony control point 102. Thereafter, if a certain UPnP telephony control point 102 calls an action for managing the session using the user ID, the telephony profile management service 201 can determine whether to execute the action by comparing the user ID included in the action with the user ID set so as to manage the session. That is, the telephony profile management service 201 determines to execute only the action that includes an ID identical with the user ID set so as to manage the session.

Also, when the session is generated, the telephony profile management service 201 can set the user ID that can directly manage the session. In this case, the telephony profile management service 201 transfers the user ID information that can manage the session to the UPnP telephony control point 102, and the UPnP telephony control point 102 displays the user ID information that can manage the session to inform the user of the user ID information.

The telephony data transmission service 202 internally controls the call transmission agents 108 and 111, and starts or ends audio and video streaming between the call transmission agents 108 and 111 by controlling the call data transmission/reception between the telephony terminal 103 and the electronic device 104.

Also, if a user selects the telephony terminal and the electronic device for the communication connection in a state where a plurality of telephony terminals or electronic devices exist on the home network, the telephony data transmission service 202 transfers information on the selected telephony terminal and electronic device to the UPnP telephony control point 102, and again transfers the information to the telephony data transmission service 202 of another selected electronic device. Accordingly, the telephony data transmission service 202 controls the call transmission agent 108 to start the call data transmission/reception between the selected telephony terminal and the electronic device, and also controls the call transmission agent 108 to end the data transmission/reception even when the data transmission/reception is ended.

The additional service 203 provides an auto response function of the telephony terminal 103 set or used by the electronic device 104, and a function of transferring an input value to the electronic device 104 after defining and setting an input type of an input device when the electronic device 104 has no input device for inputting text. This additional service 203 is an optional module, and may be selectively configured within the UPnP telephony server 106.

On the other hand, the non-UPnP call control management module 107 performs a call control using a remote user interface (UI) protocol such as CEA (Consumer Electronics Association) 2014 and XRT (Extended Remoting Technology) or Session Initiation Protocol (SIP) technology, without using the UPnP protocol. For example, if the UPnP telephony control point 102 does not exist, the electronic device 104 can perform the call transmission/reception with the telephony terminal 103 through the non-UPnP call control management module 107. The non-UPnP call control management module 107 is an optional module, and may be selectively configured within the telephony terminal 103.

The call transmission agent 108 is a module that controls the call data transmission/reception between the telephony terminal 103 and the electronic device 104, and transmits/receives call data using defined transmission media, a protocol, a transmission format, an audio/video codec. That is, the call transmission agent 108 sets a channel for data transmission between the telephony terminal 103 and the electronic device 104, changes the codec and the data format so that the electronic device 104 can use the call data received from the telephony core module 105, and transfers the changed codec and data format to the electronic device 104 using a transmission protocol engaged in advance. Also, the call transmission agent 108 changes the call data received from the electronic device 104 into a codec and data format that can be transferred to the telephony core module 105, and transfers the changed codec and data format to the telephony core module 105. Here, a plurality of telephony clients such as electronic device 104 may be provided, and the call transmission agent 108 prepares and maintains the call transmission agents of the respective telephony clients and a plurality of sessions. In this case, the used transmission media, protocol, transmission format, and codec are not limited to a specified technology. Accordingly, in the present invention, the call data can be transmitted/received between the UPnP telephony server 103 and the UPnP telephony client 104, which use different data formats or codecs.

On the other hand, the electronic device 104 includes a UPnP telephony client 209 including a telephony profile management service 204, a telephony data transmission service 205, and an additional service 206, the non-UPnP call control management module 110, and the call transmission/reception agent 111. In this case, the telephony profile management service 204 and the telephony data transmission service 205 may be configured into one media management service module.

Since the constituent elements included in the electronic device 104 perform the same operations as those of the constituent elements of the telephony terminal 103, which have been explained together with the telephony terminal 103 as described above, the detailed explanation thereof will be omitted.

Hereinafter, the operation of giving a monopoly according to an embodiment of the present invention will be described. One embodiment of the present invention provides a method of giving a monopoly of a call to a user as using the existing UPnP device protection.

In an embodiment of the present invention, first, during the basic setting for the call, an authority (user and role) is given for each SessionID. In order to monopolize the call, it is required to limit the authority that can correct and change the currently set session. In other words, all users can access the action for correcting and changing the session, but an access control is performed with respect to the session to be changed using the action. Since each device discriminates the session by its session ID, it can generate a table including a list such as Table 1 below with respect to which user can perform an access for each Session ID and which role is accessible.

TABLE 1

|   | SessionID type | Role | User Identity |
|---|---|---|---|
| 1 | CallID | Admin | Jeyoung |
| 2 | MediaSessionID | Basic | Jooyeol |
| 3 | MediaSessionID | Basic | Jooyeol |

FIG. 3 illustrates an example of call information including a list that indicates a session correction authority according to an embodiment of the present invention, and FIG. 4 illustrates an example of transferring a list that indicates a session correction authority using an independent state variable according to an embodiment of the present invention. The list information as shown in Table 1 may be included in information such as call information as shown in FIG. 3 to be transferred to the CP, or may be transferred using an independent state variable such as SessionACL. In order to obtain such as state variable, an action such as getSessionACL( ) may be defined.

Also, the above-described table may be used only internally, and only information such as sessionOwner@type may be shown to the user.

The ACL (Access Control List) means the following. A specified session is discriminated by an ID, and in order to perform the action such as correction or end of the session that is discriminated by the session ID, the CP should fulfill the following necessary conditions. sessionOwner@type can have one value among user, role, and user and role, and the device determines whether a user has an authority that can control the session ID with the three values owned by the CP. For example, if sessionOwner@type=user, that is, if sessionOwner@type is set as a user, only a user having the same value as the value of sessionOwner can control the session. Also, if sessionOwner@type=role, only a user having the same role as the value of sessionOwner can control the session. Also, if sessionOwner@type is set to user and role, the session can be controlled when both the two conditions as described above are satisfied. In the case where a plurality of sessionOwner items exists, the session control is permitted when only one of the plurality of sessionOwner values is satisfied.

In the present invention, for a basic monopoly, it is required to set the execution authority of all the actions to "basic". This means that the access control for the action is not actually permitted, and for the purpose of the user authentication only, a basic role that requires introduction is set.

Figure 5:
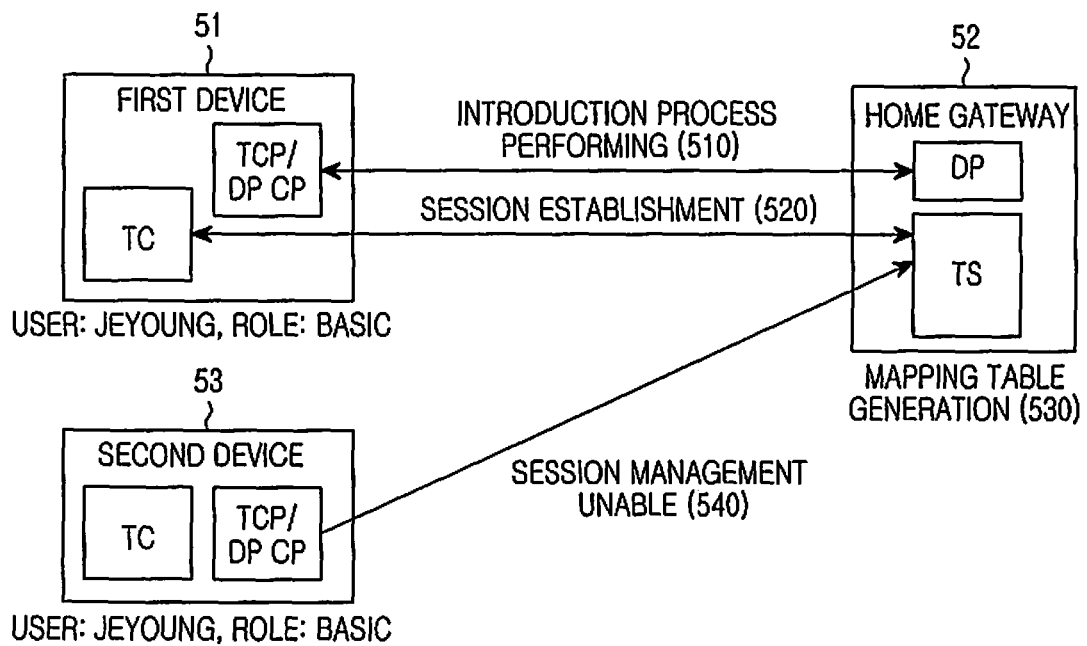
FIG. 5 illustrates a problem that occurs when an authority that is higher than a basic authority is given to a UPnP action.

If an authority that is higher than the basic authority is given to a specified action, as shown in FIG. 5, there is a problem in that it is impossible to cut off the session set by the device itself using another CP. FIG. 5 illustrates a problem that occurs when an authority that is higher than the basic authority is given to the UPnP action. Referring to FIG. 5, in the case where a first user having a basic role named "Jeyoung" intends to perform a call transmission/reception through a home gateway (HGW) 52 that operates as a telephony server using a first phone 51 and a second phone 53 that operate as a telephony client and a telephony control point, respectively, the first phone 51 performs an introduction process based on the HGW 52 and the DP in step 510, and if the session between the first phone (telephony client) 51 and the HGW (telephony server) 52 is established in step 520, the telephony server generates a mapping table for a call ID, a user ID, and a role. If the authority of the UPnP action is a manager authority in the case where the first user intends to use the second phone 53 for the session instead of the first phone 51, the first user cannot execute the UPnP action such as ModifyCall( ), StartMediaTransfer( ), StopCall( ), and the like, unless a manager role is provided, and thus the session cannot be managed, at step 540.

Figure 6:
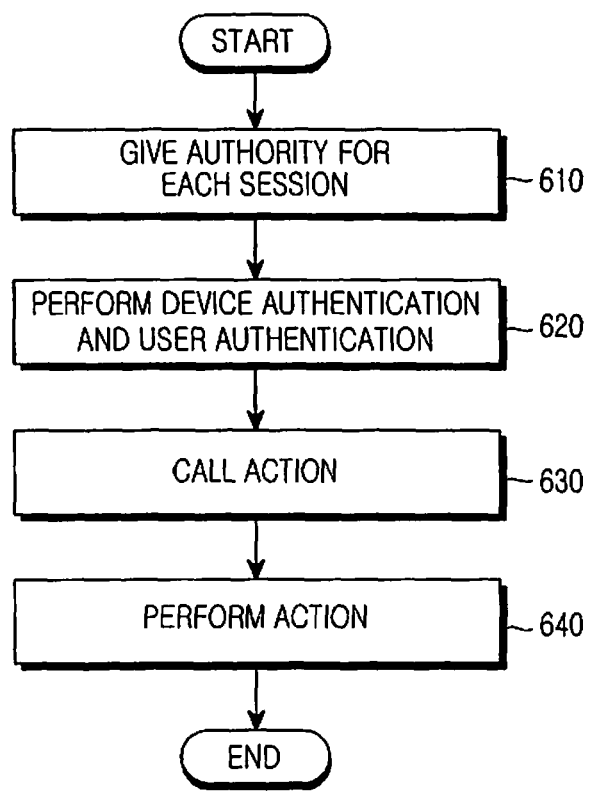
FIG. 6 illustrates a flowchart of an operation of giving a monopoly of a phone call according to an embodiment of the present invention.

FIG. 6 is a flowchart of the operation of giving a monopoly of a phone call according to an embodiment of the present invention. Referring to FIG. 6, an authority is given for each session in step 610. In this case, sessionOwner information may be added to input parameters, such as StartCall( ), AcceptCall( ), and the like, for setting the session, and such parameters may be used when the session is controlled using another CP later. The sessionOwner information may be included in the existing CallInfo or a state variable such as sessionACL may be newly defined. In the case of newly defining the state variable, it is required to define a new action whereby the CP can confirm the state variable.

In step 620, a device authentication and a user authentication are performed. The device authentication and the user authentication may be performed prior to the operation of giving an authority for each session in step 610. In the case of the first CP that generates the session, the session authority giving process is performed after the authentication process is basically performed. However, in the case of a third CP, it controls the already made session, and thus the operation of giving the authority for each session has already been performed. In order to give the monopoly, the device is not permitted to have the role, and thus the CP should perform the user authentication after the device authentication.

Then, in step 630, a necessary action is called, and the role and the user of the called CP are confirmed. Also, sessionOwner@type information is confirmed in the session to be controlled by the action, and it is confirmed whether to perform the action.

Then, in step 640, in the case where the authority is confirmed, the action is performed, and the resultant value is returned.

On the other hand, in another embodiment of the present invention, during the basic setting for the call, an authority (user) is given for each session ID. For the call monopoly, it is required to limit the authority that can correct and change the currently set session. In other words, all the users can access the action for correcting and changing the session, but the access control is performed with respect to the session to be changed using the action. Since each device discriminates the session by its session ID, it can generate a table including a list such as Table 2 below with respect to which user can perform an access for each Session ID and which role is accessible.

TABLE 2

|   | SessionID type | User Identity |
|---|---|---|
| 1 | CallID | Jeyoung |
| 2 | MediaSessionID | Jooyeol |
| 3 | MediaSessionID | CP identity |

TABLE 3

|   | SessionID type | Session ID | User Identity |
|---|---|---|---|
| 1 | CallID | 1 | 1234 |
| 2 | MediaSessionID | 2 | 1434 |
| 3 | MediaSessionID | 3 | 1436 |

Figure 7:
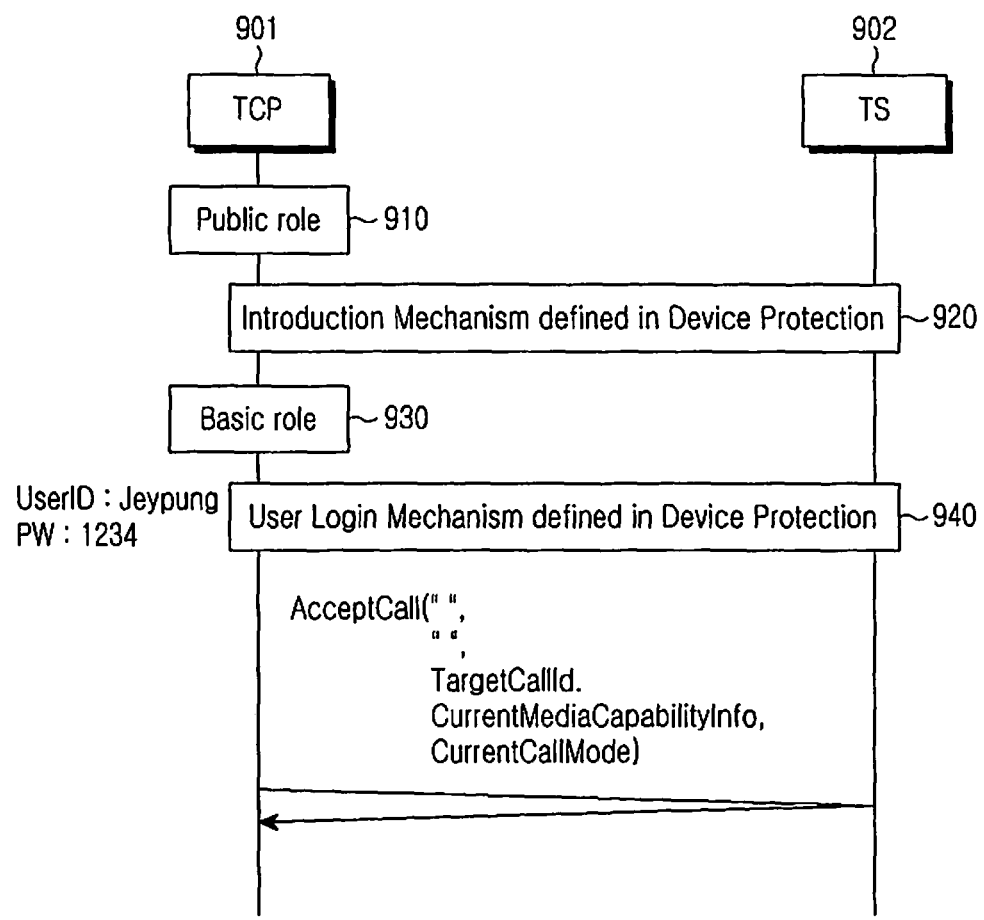
FIG. 7 is a flow diagram illustrating a process of giving an authority that can control a session to a user who is currently using the session when the session is generated according to another embodiment of the present invention.

FIG. 7 is a flow diagram illustrating a process of giving an authority that can control a session to a user who is currently using the session when the session is generated according to another embodiment of the present invention, and FIG. 8 illustrates an example of call information including a list that indicates a session correction authority according to another embodiment of the present invention.

A user can acquire the role basically according to a process defined in the UPnP DP. In the case of a public role 910, the TCP (Telephony Control Point) 901 follows an introduction mechanism 920 defined in the DP, and in the case of a basic role 930, the TCP 901 performs a user login mechanism 940 defined in the DP. In this case, the login process can be performed using a user ID and a password (PW). If the TCP 901 calls the action in a state where a user has logged in, the TS (Telephony Server) 902 can recognize the user who has called the action. If the user has not logged in, the TS 902 can recognize which TCP 901 has called the action.

As illustrated in FIG. 7, when the TCP calls an Accept-Call( ), whether to give a monopoly to the session to be generated by the TS 902 can be determined using an input argument such as CurrentCallMod. In the case of giving the monopoly, the TS 902 internally generates a table for mapping the session IDs and the user IDs as shown in Table 2 as described above, and displays the table using an element such as SessionOwner in Callinfo as illustrated in FIG. 8. The actions for forming the session, such as StartCall( ) and StartMediatransfer( ), can give the authority to the session in a method of mapping the user IDs and the session IDs in the same manner as AccepCall( ).

The monopoly may be given to not only Call but also a media session between the TS 902 and the TCP 901, and the monopoly that is given to the media session is reflected in CallInfo using SessionOwner below MediaSessionID.

The session to which the monopoly has been given may be changed or ended only by a user who has generated the session, and the CP that has received Admin Role from the DP may also change or end the session even if the CP is not the user who has generated the session.

Next, another embodiment of the present invention will be described. This embodiment of the present invention simply performs user authentication without using the device protection, and using this, gives the monopoly to the user.

First, as the basic setting, the authority (user ID) is given for each session ID. Without limiting the callable action according to the user, the controllable session is determined according to the user in the same manner as in the above-described embodiment of the present invention. However, the user having the authority is discriminated using the user ID without determining the role or performing the user authentication.

Accordingly, a table that is actively generated by the telephony server is different from that according to an embodiment of the present invention. In still another embodiment of the present invention, a table that is generated by the telephony server is shown in Table 3 below.

The telephony server internally stores the table for mapping the user IDs for basically discriminating the users and the session IDs. This table is actively generated when the session is formed.

The telephony control point uses the user IDs as factors of actions for changing or ending the session, and the telephony server confirms whether the user has the authority to change or end a specified session by contrasting the user ID with the table.

Figure 9:
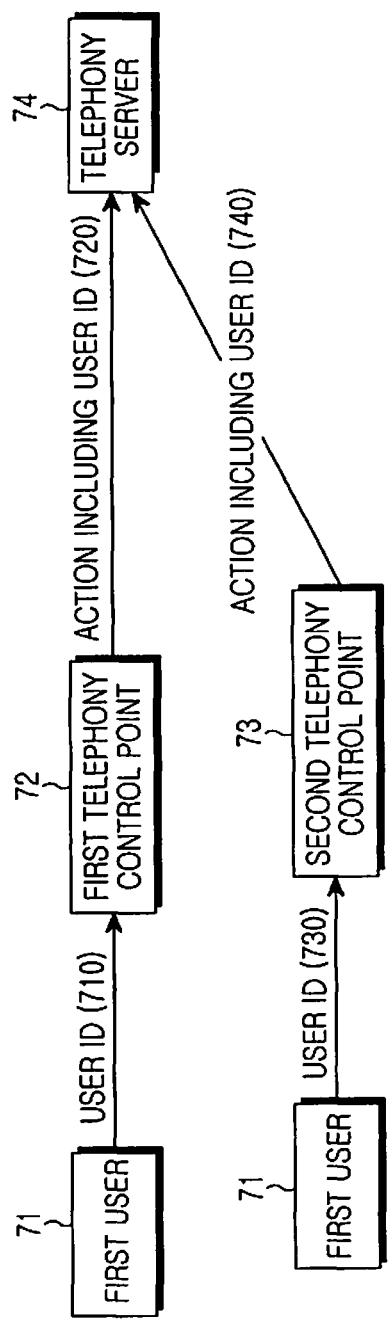
FIG. 9 is a flow diagram illustrating an operation of giving a monopoly of a phone call through a user's setting of a user ID according to another embodiment of the present invention.

FIG. 9 is a flow diagram illustrating an operation of giving a monopoly of a phone call through a user's setting of a user ID according to another embodiment of the present invention. FIG. 9 shows the operation in the case where a user generates and inputs a user ID according to another embodiment of the present invention.

Referring to FIG. 9, in step 710, a first user 71 inputs a user ID for discriminating the first user to a first telephony control point 72. Then, in step 720, the first telephony control point 72 calls an action for generating a call and a session from a telephony server 74, and uses the user ID of the first user 71 as a factor of the action.

Then, the telephony server 74 generates a session and a table as illustrated in Table 2, and permits the operation only with respect to the action having an appropriate user ID for the session.

In step 730, if the first user 71 moves to a second telephony control point 73 that is different from the existing control point, the first user 71 inputs the user ID stored therein to the new second telephony control point 73. Then, in step 740, the second telephony control point 73 uses the user ID as a factor when calling the action that manages the session. The telephony server 74 confirms whether the user has the authority for the corresponding session by comparing the transferred user ID with the table, and performs the called action if it is confirmed that the user has the authority.

Figure 10:
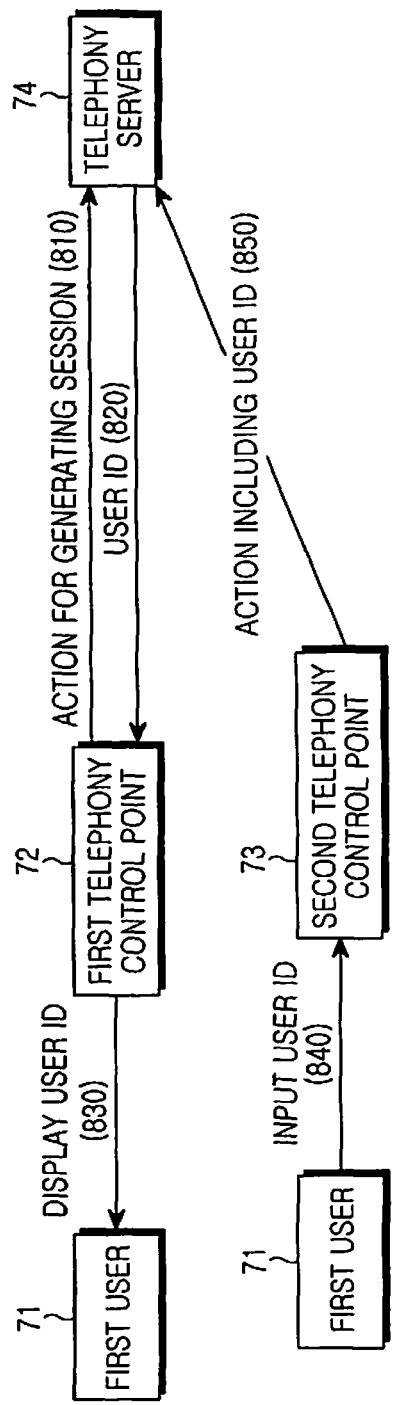
FIG. 10 is a flow diagram illustrating an operation of giving a monopoly of a phone call through a telephony server's setting of a user ID according to still another embodiment of the present invention.

FIG. 10 is a flow diagram illustrating an operation of giving a monopoly of a phone call through a telephony server's setting of a user ID according to still another embodiment of the present invention. FIG. 10 shows the operation in the case where a telephony server generates a user ID and informs the user of the generated user ID.

Referring to FIG. 10, if a first user 71 calls an action for generating a session using a first telephony control point 72 in step 810, the first telephony control point 72 generates a call session and a media session, and receives a user ID in step 820 that can control this as a response to the action. In this case, the telephony server 74 generates the session and a table as illustrated in Table 3, and performs the operation only with respect to the action that includes the permitted user ID.

In step 830, the first telephony control point 72 informs the user of the user ID received from the telephony server 74 by displaying the user ID. Then, if the user moves to another control point, i.e. a second telephony control point 73, the user inputs the user ID stored therein to the second telephony control point 73 in step 840. Then, the second telephony control point 73 uses the user ID input by the first user as a factor when calling the action that manages the session in step 850. The telephony server 74 confirms whether the user has the authority for the session by comparing the transferred user ID included as the factor of the called action with the table, and performs the action if it is confirmed that the user has the authority for the session. According to the two methods described above, the subjects that generate the user ID are different from each other, but other operations and table generation methods are the same.

As described above, according to the present invention, during the UPnP telephony service, a monopoly for the phone call made by a user is given to the user, and the user is authorized so that another person cannot cut off the call. Also, the call monopolization problem of the UPnP telephony service, which could not be solved by the existing UPnP IGD based device protection, can be solved only by changing the telephony action and the state variable without correcting the device protection.

While the operation and configuration of the method and apparatus for giving the call monopoly in the call transmission/reception system using the UPnP has been shown and described with reference to the above embodiments of the present invention, various modifications may be made without departing from the scope of the invention, as defined by the appended claims.

What is claimed is:

1. A method of giving a monopoly of a call by a server in a call transmission/reception system, comprising the steps of:
   receiving a request for a call management from a first device;
   storing, in a table, a user identity (ID) of the first device in relation to a user ID for the call management using information in the request, upon receiving the request;
   giving a monopoly of a call to the first device for managing the call in accordance with the table;
   receiving a request for call management from a second device while the first device has the monopoly of the call;
   determining, using the table, whether the second device has the monopoly of the call; rejecting the request for the call management from the second device if the table indicates that a user ID of the second device does not have the monopoly of the call;
   accepting the request for the call management from the second device, if the table indicates that the user ID of the second device has the monopoly of the call; and
   in response to a user associated with the user ID moving from the first device to the second device, giving the monopoly of the call to the second device for managing the call.

2. The method as claimed in claim 1, further comprising: storing the user ID of the second device.

3. The method as claimed in claim 1, wherein the request for the call management from the first device includes the user ID of the first device.

4. The method as claimed in claim 1, further comprising: verifying the user ID of the first device included in the request from the first device in response to receiving the request for the call management from the first device.

5. The method as claimed in claim 1, wherein determining whether the second device has the monopoly of the call comprises:
   checking the user ID of the second device included in the request received from the second device using the table.

6. The method as claimed in claim 5, wherein checking the user ID of the second device comprises:
   comparing the user ID of the second device to the user ID for the call management stored in the table.

7. The method as claimed in claim 1, wherein rejecting the request for the call management from the second device comprises:
   rejecting the request for the call management from the second device if the user ID of the second device is not the user ID for the call management.

8. A server for giving a monopoly of a call in a call transmission/reception system, comprising:
   a memory; and
   a processor configured to:
      receive a request for a call management from the first device,
      store, in a table, a user identity (ID) of the first device in relation to a user ID for the call management using information in the request, upon receiving the request,
      give a monopoly of a call to the first device for managing the call in accordance with the table,
      receive a request for call management from a second device while the first device has the monopoly of the call,
      determine, using the table, whether the second device has the monopoly of the call,
      reject the request for the call management from the second device if the table indicates that a user ID of the second device does not have the monopoly of the call,
      accept the request for the call management from the second device, if the table indicates that the user ID of the second device has the monopoly of the call, and
      in response to a user associated with the user ID moving from the first device to the second device, give the monopoly of the call to the second device.

9. The server as claimed in claim 8, wherein the processor is further configured to store the user ID of the second device.

10. The server as claimed in claim 8, wherein the request for the call management from the first device includes the user ID of the first device.

11. The server as claimed in claim 8, wherein the processor is further configured to verify the user ID of the first device included in the request from the first device in response to receiving the request for the call management from the first device.

12. The server as claimed in claim 8, wherein the processor is configured to determine whether the second device has the monopoly of the call by checking the user ID of the second device included in the request received from the second device using the table.

13. The server as claimed in claim 12, wherein the processor is configured to check the user ID of the second device by comparing the user ID of the second device to the user ID for the call management stored in the table.

14. The server as claimed in claim 13, wherein the processor is configured to reject the request for the call management from the second device if the user ID of the second device is not the user ID for the call management.

* * * * *